(12) United States Patent
Li et al.

(10) Patent No.: US 12,210,740 B2
(45) Date of Patent: Jan. 28, 2025

(54) HANDWRITING INPUT DISPLAY METHOD AND DEVICE, COMPUTER READABLE STORAGE MEDIUM (71) Applicant: BOE Technology Group Co., Ltd., Beijing (CN)

(72) Inventors: Zhongru Li, Beijing (CN); Chuan Li, Beijing (CN); Haiyan Chai, Beijing (CN); Yuzhu Liu, Beijing (CN); Xiaoyu Yin, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/921,638

(22) PCT Filed: Oct. 26, 2021

(86) PCT No.: PCT/CN2021/126505
§ 371 (c)(1),
(2) Date: Oct. 27, 2022

(87) PCT Pub. No.: WO2023/070334
PCT Pub. Date: May 4, 2023

(65) Prior Publication Data
US 2024/0241636 A1 Jul. 18, 2024

(51) Int. Cl.
G06F 3/04883 (2022.01)

(52) U.S. Cl.
CPC .............................. G06F 3/04883 (2013.01)

(58) Field of Classification Search
None
See application file for complete search history.

(56) References Cited

U.S. PATENT DOCUMENTS

2005/0206627 A1    9/2005  Simmons
2020/0356254 A1* 11/2020  Missig ................ G06F 3/04842

FOREIGN PATENT DOCUMENTS

| CN | 1670681 A | 9/2005 |
| CN | 104281379 A | 1/2015 |
| CN | 108595054 A | 9/2018 |
| CN | 111352599 A | 6/2020 |

* cited by examiner

Primary Examiner — Duane N Taylor, Jr.
(74) Attorney, Agent, or Firm — Ling Wu; Stephen Yang; Ling and Yang Intellectual Property (57) ABSTRACT A method for handwriting input display, a device thereof and a computer-readable storage medium. The method for handwriting input display includes: receiving and displaying a first input of a user, wherein the first input is one or more first contents input in a handwriting way; receiving and displaying a second input of the user, wherein the second input is a mark line for highlighting the one or more first contents, and the mark line contains an overlapping area with the one or more first contents; and adjusting a line width of the mark line according to a height of a first content of the overlapping area.

18 Claims, 5 Drawing Sheets

HANDWRITING INPUT DISPLAY METHOD AND DEVICE, COMPUTER READABLE STORAGE MEDIUM

CROSS-REFERENCE TO RELATED APPLICATION

The present application is a U.S. National Phase Entry of International Application No. PCT/CN2021/126505 having an international filing date of Oct. 26, 2021, the entire content of which is hereby incorporated by reference.

TECHNICAL FIELD

Embodiments of the present disclosure relate to, but are not limited to, the technical field of computer application, and particularly to a method for handwriting input display and a device thereof, and a computer-readable storage medium.

BACKGROUND

Interactive electronic whiteboard is a kind of conference or education assistant human-computer interaction equipment, which can realize dust-free writing, remote conference and other functions. The interactive electronic whiteboard integrates computer, player, projector, electronic writing board and other functions. Contents written through an electronic writing board can be saved into PDF (Portable Document Format) or a variety of picture formats, which is more convenient for dissemination and storage. In addition, the contents written through the electronic writing board can record handwriting points, and optimize the writing contents according to a handwriting point analysis algorithm, so as to realize richer functions such as handwriting optimization and strokes that cannot be realized by a traditional blackboard, and improve the user experience.

SUMMARY

The following is a summary of subject matters described herein in detail. The summary is not intended to limit the protection scope of claims.

An embodiment of the present disclosure provides a method for handwriting display method, including: receiving and displaying a first input of a user, wherein the first input is one or more first contents input in a handwriting way; receiving and displaying a second input of a user, wherein the second input is a mark line for highlighting the one or more first contents, and the mark line contains an overlapping area with the one or more first contents; and adjusting a line width of the mark line according to a height of a first content of the overlapping area.

In some exemplary embodiments, before adjusting the line width of the mark line according to the height of the first content of the overlapping area, the method further includes: acquiring handwriting point information of the first content of the overlapping area; and calculating the height of the first content of the overlapping area according to the acquired handwriting point information.

In some exemplary embodiments, after receiving the second input of the user, the method further includes: splitting the first content of the overlapping area into rows; or, after receiving the first input of the user, the method further includes: splitting the first content into rows; and adjusting the line width of the mark line according to the height of the first content of the overlapping area includes: adjusting the line width of the mark line overlapping with a first content of each row according to a height of the first content of each row of the overlapping area.

In some exemplary embodiments, the handwriting point information is divided into multiple arrays, wherein each array includes attribute information of multiple handwriting points in a stroke, and the attribute information includes X-axis coordinates, Y-axis coordinates, and pen lift mark bits, wherein the one stroke is a writing track between a pen drop and a pen lift.

In some exemplary embodiments, the splitting of the first content of the overlapping area into rows includes: acquiring the handwriting point information of the mark line, and determining the number of the mark lines according to the pen lift flag bit information of the mark line; acquiring the handwriting point information of the first content of the overlapping area; and determining that first contents overlapping with the same mark line are located in the same row, and first contents overlapping with different mark lines are located in different rows according to the coordinate information of the mark line and the first contents.

In some exemplary embodiments, the splitting of the first content into rows includes: acquiring the handwriting point information of the first content, and establishing a third coordinate system according to the acquired handwriting point information, wherein an abscissa of the third coordinate system is a Y-axis coordinate of a handwriting point, and an ordinate of the third coordinate system is the number of handwriting points corresponding to the Y-axis coordinate of the handwriting point; fitting coordinate points in the third coordinate system into a second curve, and determining that handwriting points between adjacent valleys on the second curve are located in the same row.

In some exemplary embodiments, the first content includes one or more characters and/or graphics, and the calculating the height of the first content of the overlapping area according to the acquired handwriting point information, includes: calculating a height of each character and/or graphic in the overlapping area; and calculating a height of the first content of each row according to the height of each character and/or graphic.

In some exemplary embodiments, the method further includes: identifying the first content of the overlapping region through a neural network.

In some exemplary embodiments, the calculating the height of each character and/or graphic of the overlapping area includes: acquiring the handwriting point information of the first content of the overlapping area, establishing a first coordinate system according to the acquired handwriting point information, wherein an abscissa of the first coordinate system is an X-axis coordinate of the handwriting point, and an ordinate of the first coordinate system is a Y-axis coordinate of the handwriting point; when a spacing between the abscissas of two handwriting points is less than or equal to a preset spacing, determining that the two handwriting points are handwriting points of one character and/or graphic; when a spacing between abscissas of two handwriting points is larger than the preset spacing, determining that the two handwriting points are handwriting points of two characters and/or graphics; and obtaining a height of each character and/or graphic in the overlapping area by subtracting a Y-axis coordinate of a coordinate point with a minimum Y-axis coordinate from a Y-axis coordinate of a coordinate point with a maximum Y-axis coordinate in multiple handwriting points of each character and/or graphic in the overlapping area.

In some exemplary embodiments, the calculating the height of each character and/or graphic of the overlapping area includes: acquiring the handwriting point information of the first content of the overlapping area, establishing a first coordinate system and a second coordinate system according to the acquired handwriting point information, wherein an abscissa of the first coordinate system is an X-axis coordinate of the handwriting point, an ordinate of the first coordinate system is a Y-axis coordinate of the handwriting point, an abscissa of the second coordinate system is an X-axis coordinate of the handwriting point, and an ordinate of the second coordinate system is the number of handwriting points corresponding to the X-axis coordinate of the handwriting point; fitting coordinate points in the second coordinate system into a first curve, and determining that handwriting points between adjacent valleys on the first curve are handwriting points of the same character and/or graphic; in the first coordinate system, obtaining a height of each character and/or graphic in the overlapping area by subtracting a Y-axis coordinate of a coordinate point with a minimum Y-axis coordinate from a Y-axis coordinate of a coordinate point with a maximum Y-axis coordinate in multiple handwriting points of each character and/or graphic in the overlapping area.

In some exemplary embodiments, before receiving the second input of the user, the method further includes: converting a character and/or graphic of the first input into a character and/or graphic of a standard style, and adjusting a size of the character and/or graphic of the standard style according to an average height of characters and/or graphics of the first input.

In some exemplary embodiments, the calculating the height of the first content of the overlapping area according to the acquired handwriting point information, includes: acquiring one or more strokes overlapping with each mark line; determining a highest Y-axis coordinate and a lowest Y-axis coordinate of the one or more strokes according to the handwriting point information of each stroke; and taking a difference between the highest Y-axis coordinate and the lowest Y-axis coordinate of the one or more strokes as the height of the first content of the overlapping area.

In some exemplary embodiments, the adjusting the line width of the mark line according to the height of the first content of the overlapping area includes: the adjusted line width of the marking line is $K1*h_L$, K1 is a real number between 0.5 and 1.5, and $h_L$ is the height of the first content of the row.

In some exemplary embodiments, K1 is between ⅓ and ⅚.

In some exemplary embodiments, the adjusted mark line is centered on a centerline of each row of a first content in an ordinate direction, or is centered on the mark line before the adjusting.

An embodiment of the disclosure also provides a device for handwriting input display, which includes a touch screen, a processor and a memory; wherein, the touch screen is used for interacting with a user; the processor runs a program corresponding to executable program codes by reading the executable program codes stored in the memory for implementing the method for handwriting input display as described in the previous item.

An embodiment of the present disclosure also provides a computer-readable storage medium, which stores one or more programs capable of being executed by one or more processors to implement the acts of the method for handwriting input display described above.

Other aspects may be comprehended upon reading and understanding drawings and detailed descriptions.

BRIEF DESCRIPTION OF DRAWINGS

Accompanying drawings are used for providing further understanding of technical solutions of the present disclosure, constitute a part of the specification, and together with the embodiments of the present disclosure, are used for explaining the technical solutions of the present disclosure but not to constitute limitations on the technical solutions of the present disclosure. Shapes and sizes of various components in the drawings do not reflect actual scales, but are only intended to schematically illustrate contents of the present disclosure.

DETAILED DESCRIPTION

To make objectives, technical solutions, and advantages of the present disclosure clearer, the embodiments of the present disclosure will be described in detail with reference to the accompanying drawings. It is to be noted that implementation modes may be implemented in multiple different forms. Those of ordinary skills in the art may easily understand such a fact that implementations and contents may be transformed into various forms without departing from the purpose and scope of the present disclosure. Therefore, the present disclosure should not be explained as being limited to contents described in following implementation modes only. The embodiments in the present disclosure and features in the embodiments may be combined randomly with each other without conflict.

Unless otherwise defined, technical terms or scientific terms publicly used in the embodiments of the present disclosure should have usual meanings understood by those of ordinary skill in the art to which the present disclosure belongs. "First", "second", and similar terms used in the embodiments of the present disclosure do not represent any order, quantity, or importance, but are only used for distinguishing different components. "Include", "contain", or a similar term means that an element or object appearing before the term covers an element or object and equivalent thereof listed after the term and does not exclude other elements or objects.

Interactive electronic whiteboard is a kind of conference or education assistant human-computer interaction equipment, which can realize dust-free writing, remote conference and other functions. Interactive electronic whiteboard integrates computer, player, projector, electronic writing board and other functions. Contents written through an electronic writing board can be saved into PDF or a variety of picture formats, which is more convenient for dissemination and storage. In addition, the contents written through the electronic writing board can record handwriting points, and optimize the writing content according to a handwriting point analysis algorithm, so as to realize richer functions such as handwriting optimization and stroke that cannot be realized by a traditional blackboard, and improve user experience.

Electronic whiteboard marker pen, also known as a marker pen, is a special color pen with high transparency for writing or painting, which is often used to mark and highlight a paragraph of text in writing scenes for highlighting. The writing board software of the electronic whiteboard adds a marker pen function, and the user can select this mode to cross a paragraph of text, which can achieve a goal of highlighting this paragraph of text. However, a handwriting width of an existing marker pen can not be automatically adjusted, and the user needs to manually adjust the thickness of the handwriting of the marker pen according to a size of a written character, and then use the mark function after selecting the thickness, and the handwriting width of the marker pen needs to be adjusted according to the size of a character every time when used, so the operation convenience is poor.

Figure 1:
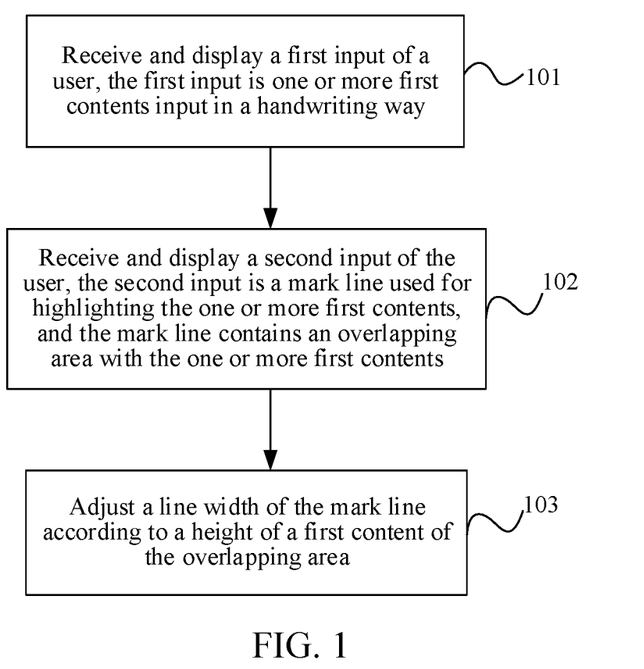
FIG. 1 is a schematic flowchart of a method for handwriting input display according to an embodiment of the present disclosure.

FIG. 1 is a flow diagram of a method for handwriting input display provided by an embodiment of the present disclosure, which can be applied to electronic devices with electronic writing board functions such as a desktop computer, a notebook computer, a smart phone, a tablet computer, etc. Optionally, the method can be applied to the electronic writing board software installed in the electronic devices, or can be applied to a browser in a form of a web page. When a user opens a corresponding web page in the browser for writing or displaying, the method for handwriting input display of an embodiment of the present disclosure is automatically called.

For convenience of description, the following embodiments will explain the present disclosure by taking the application of the method for handwriting input display of an embodiment of the present disclosure to interactive electronic whiteboard software as an example. In an exemplary embodiment, the hardware configuration of the electronic whiteboard includes a touch screen, a camera, a speaker, a microphone, a PC (Personal Computer) module, software (writing board software, video conference, etc.), an operating system, an interface (including High Definition Multimedia Interface (HDMI), Universal Serial Bus (USB), VGA (Video Graphics Array), etc.), an integrated motherboard, etc.

As shown in FIG. 1, the method for handwriting input display includes the following acts.

In act 101, a first input of a user, which may be one or more first contents input in a handwriting way, is received and displayed.

In some exemplary embodiments, the first content may be identified as one or more characters and/or graphics through a neural network (e.g., a Recurrent Neural Network (RNN), etc.).

In some exemplary embodiments, the characters may include literals, letters, numbers, arithmetic symbols, punctuation marks and any other special characters and the like.

In an embodiment of the present disclosure, special characters are symbols that are less commonly used and difficult to be directly input than traditional or commonly used symbols, and have a wide variety of types. Exemplary, the special characters may include: mathematical symbols (for example, $\approx$, $\equiv$, $\neq$, $\leq$, $\geq$, $<$, $>$, etc.), unit symbols (for example, $°$ C., Å, %, ‰, m², etc.), pinyin characters (for example, $\bar{a}$, á, ǎ, à, ō, ó, ǒ, ò, etc.), etc.

Figure 2A:
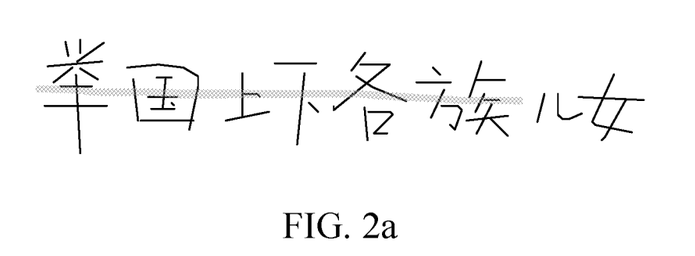
FIGS. 2a to 2c are schematic diagrams of several first inputs and second inputs according to embodiments of the present disclosure.
Figure 2B:
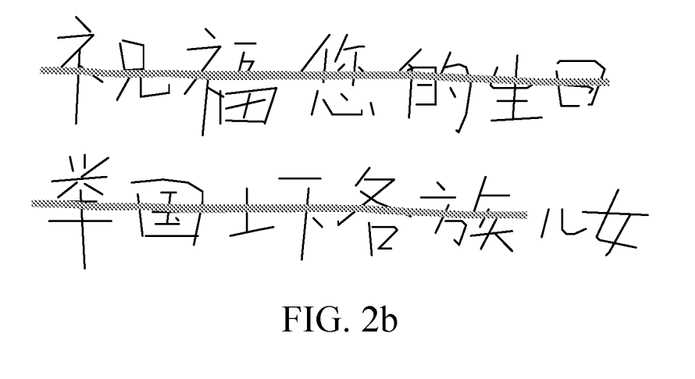
Figures 2C, 3A:
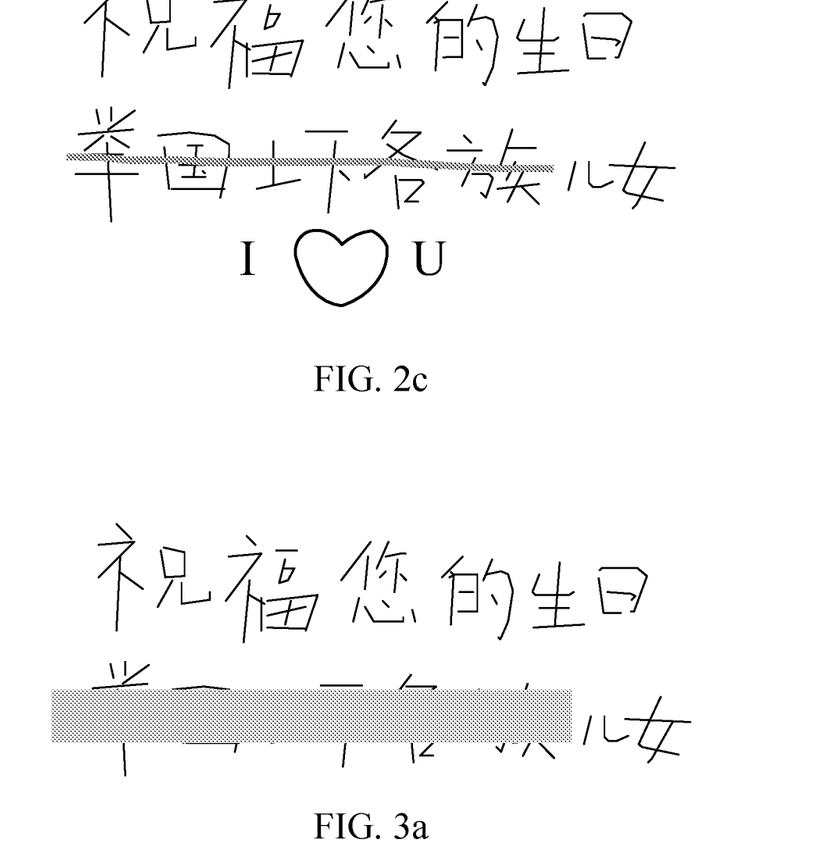
FIGS. 3a to 3d are schematic diagrams of mark lines of several types according to embodiments of the present disclosure.

In some exemplary embodiments, the first input may include one row of characters and/or graphics, or may include multiple rows of characters and/or graphics as shown in FIG. 2a, FIG. 2b, or FIG. 2c.

In other exemplary embodiments, the method for handwriting input display of an embodiment of the present disclosure may also not identify the first content through the neural network, but only treat the first content as one or more strokes (i.e. writing tracks).

In some exemplary embodiments, before the first input of the user is received, the method further includes: an input mode of the whiteboard pen is set as a writing mode in response to the first operation of the user. In the writing mode, the user can use the whiteboard pen to input characters and/or graphics on the interactive electronic whiteboard.

In act 102, a second input of the user is received and displayed, the second input may be a mark line for highlighting the one or more first contents, and the mark line contains an overlapping area with the one or more first contents.

In some exemplary embodiments, a mark line is displayed on one or more characters and/or graphics in a transparent or translucent state as shown in FIG. 2a, FIG. 2b, or FIG. 2c.

In some exemplary embodiments, a mark line may be a straight line, a curve, or a polygon, etc.

In some exemplary embodiments, before the second input of the user is received, the method further includes: the input mode of the whiteboard pen is set as a marker pen mode in response to the second operation of the user. The marker pen mode is used to mark the content that needs to be marked emphatically, and the marker pen defaults to finer handwriting.

In act 103, a line width of the mark line is adjusted according to a height of the first content of the overlapping area.

In an embodiment of the present disclosure, the height of the first content refers to a difference between the Y-axis coordinate of the highest handwriting point and the Y-axis coordinate of the lowest handwriting point among multiple handwriting points of the first content. The line width of the mark line refers to a width of the mark line along an extension direction perpendicular to the mark line. For example, when the mark line extends in the X-axis direction, the line width of the mark line refers to the width of the mark line in the extension direction of the Y-axis.

By the method for handwriting input display of an embodiment of the present disclosure, the line width of the mark line is adjusted according to the height of the first content of the overlapping area, so that under a condition that the writer has no perception, the width of the marker pen handwriting is automatically adjusted, which solves the technical problems that the marker pen handwriting is too thin to reflect a mark focus, or the width of the marker pen handwriting needs to be constantly adjusted to match the height of the written text. The user does not need to manually adjust the thickness of the marker pen handwriting according to the size of the written text, thus greatly improving the writing experience of the writer.

In some exemplary embodiments, before the line width of the mark line is adjusted according to the height of the first content of the overlapping area, the method further includes: handwriting point information of the first content of the overlapping area is acquired; the height of the first content of the overlapping area is calculated according to the acquired handwriting point information; or, the acquired handwriting point information is transmitted to the first server; and the calculation result of the first server is received, wherein the calculation result is the height of the first content of the overlapping area.

In the embodiment, the height of the first content of the overlapping area can be calculated by a calculating module of a device for handwriting input display itself, or the height of the first content of the overlapping area can be calculated by a first server connected to the device for handwriting input display, which is not limited in the present disclosure.

In some exemplary embodiments, the handwriting point information is divided into multiple arrays, wherein each array includes attribute information of multiple handwriting points in a stroke, and the attribute information includes X-axis coordinates, Y-axis coordinates, pen lift flag bits, and the like.

In the embodiment, the attribute information of the multiple handwriting points in one stroke forms one array. For example, the Chinese character"—" includes a stroke "horizontal", which can include about 100 handwriting points, and the attribute information of each handwriting point includes X-axis coordinates, Y-axis coordinates, pen lifting flag bits and the like. In other exemplary embodiments, the attribute information may also include time stamp, pressure information, speed information and the like.

In some exemplary embodiments, after the second input of the user is received, the method further includes: the first content of the overlapping area is split into rows.

In other exemplary embodiments, after the first input of the user is received, the method further includes: the first content is split into rows.

As shown in FIG. 2b, the overlapping area includes multiple rows of characters and/or graphics and the rows to which the characters and/or graphics of the overlapping area belong can be distinguished in combination with a row splitting method. In the embodiment, the row splitting method may refer to some existing row splitting methods, and for example, the row splitting may be performed according to a density of coordinate points, which is not limited in the present disclosure.

In some exemplary embodiments, splitting the first content of the overlapping area into rows includes: the handwriting point information of mark lines is acquired, and the number of mark lines is determined according to pen lifting marking bit information of the mark lines; and the handwriting point information of the first content of the overlapping area is acquired; and the first contents overlapping the same mark lines are determined to be located in the same row, and the first contents overlapping different mark lines are determined to be located in different rows, according to the coordinate information of the mark lines and the first contents.

In other exemplary embodiments, splitting the first content into rows includes: the handwriting point information of the first content is acquired, and a third coordinate system is established according to the acquired handwriting point information, wherein an abscissa of the third coordinate system is a Y-axis coordinate of the handwriting point, and an ordinate of the third coordinate system is the number of the handwriting points corresponding to the Y-axis coordinate of the handwriting point; and the coordinate points in the third coordinate system are fitted into a second curve, and the handwriting points between adjacent valleys on the second curve are determined to be located in the same row.

The row splitting method of the embodiment is applicable to the first contents of overlapping areas as well as to the first contents of non-overlapping areas.

In some exemplary embodiments, the first content includes one or more characters and/or graphics, and the height of the first content of the overlapping area is calculated according to the acquired handwriting point information, including: the height of each character and/or graphic is calculated in the overlapping area; and the height of each row of the first content is calculated according to the height of each character and/or graphic (the height may be an average height or an actual height, for example).

In some exemplary embodiments, the method further includes: the first content of the overlapping region is identified through a neural network.

In some exemplary embodiments, assuming that the overlapping region includes one row of characters and/or graphics that includes N characters and/or graphics, then the average height of that row of characters and/or graphics is $h_L = \Sigma_{i=1}^{N} hi/N$.

In some exemplary embodiments, after the first content is split into rows, the line width of the mark line overlapping each row of the first content is adjusted according to the height of each row of the first content in the overlapping area.

In some exemplary embodiments, calculating the height of each character and/or graphic of the overlapping region includes: the handwriting point information of the first content of the overlapping area is acquired, a first coordinate system is established according to the acquired handwriting point information, wherein an abscissa of the first coordinate system is an X-axis coordinate of the handwriting point, and an ordinate of the first coordinate system is a Y-axis coordinate of the handwriting point; when a spacing between the abscissas of two handwriting points is less than or equal to a preset spacing, the two handwriting points are determined to be the handwriting points of the same character and/or graphic; when a spacing between the abscissas of two handwriting points is larger than the preset spacing, the two handwriting points are determined to be the handwriting points of two characters and/or graphics; and the height of each character and/or graphic in the overlapping area is obtained by subtracting a Y-axis coordinate of a coordinate point with a minimum Y-axis coordinate from a Y-axis coordinate of a coordinate point with a maximum Y-axis coordinate in multiple handwriting points of each character and/or graphic in the overlapping area.

In the embodiment, a size of the preset spacing can be determined according to a size of actual handwriting input area, the average height of each row of characters and/or graphics, and this is not limited in embodiments of the present disclosure.

In other exemplary embodiments, calculating the height of each character and/or graphic of the overlapping area includes: the handwriting point information of the first content of the overlapping area is acquired, a first coordinate system and a second coordinate system are established according to the acquired handwriting point information, wherein an abscissa of the first coordinate system is an X-axis coordinate of the handwriting point, an ordinate of the first coordinate system is a Y-axis coordinate of the handwriting point, an abscissa of the second coordinate system is an X-axis coordinate of the handwriting point, and an ordinate of the second coordinate system is the number of handwriting points corresponding to the X-axis coordinate of the handwriting point; the coordinate points in the second coordinate system are fitted into a first curve, and the handwriting points between adjacent valleys on the first curve are determined as the handwriting points of the same character and/or graphic; in the first coordinate system, a height of each character and/or graphic in the overlapping area is obtained by subtracting a Y-axis coordinate of a coordinate point with a minimum Y-axis coordinate from a Y-axis coordinate of a coordinate point with a maximum Y-axis coordinate in multiple handwriting points of each character and/or graphic in the overlapping area.

In the embodiment, assuming that the maximum Y-axis coordinate point is (x1, y1) and the minimum Y-axis coordinate point is (x2, y2) among multiple handwriting points of one character and/or graphic, the height of the character and/or graphic is $h_c = y2 - y1$.

Figure 3B:
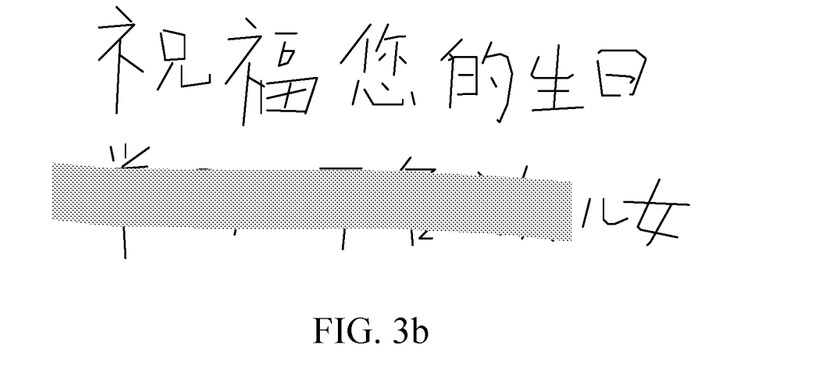
Figure 3C:
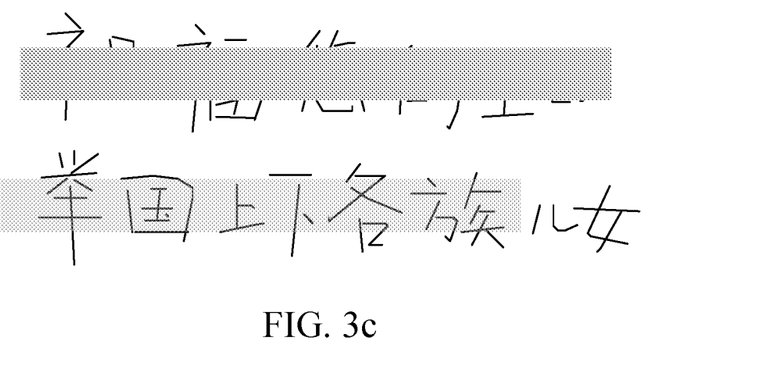
Figure 3D:
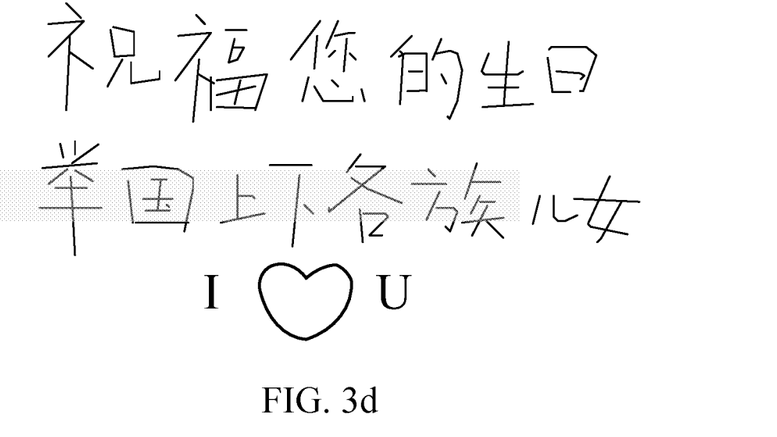

In some exemplary embodiments, adjusting the line width of the mark line according to the height of the first content of the overlapping area includes: when the first content of the overlapping area includes multiple rows, the line width of the mark line corresponding to each row of the first content is adjusted according to the height of each row of the first content, as shown in FIG. 3c; when the first content of the overlapping area is one row, the adjusted line width of the mark line is $K1*h_L$, $0.5 < K1 \leq 1.5$, and $h_L$ is the height of the first content of one row, as shown in FIG. 3a, 3b or 3d.

In some exemplary embodiments, K1 is between 1/3 and 5/6. Exemplarily, K1=2/3.

In some exemplary embodiments, the adjusted mark line is centered on a centerline of each row of a first content in an ordinate direction, or is centered on the mark line before the adjusting.

In some exemplary embodiments, a shape of the adjusted mark line can be similar to or different from a shape of the mark line before adjusting, for example, an adjusted mark line may be uniformly changed into a straight line, as shown in FIG. 3a, or similar to the shape of the mark line before adjusting, that is, if the shape of a mark line before adjusting is a curve or a polyline, the adjusted mark line is still the curve or the polyline, as shown in FIG. 3b.

In some exemplary embodiments, before the second input of the user is received, the method further includes: a character and/or graphic of the first input is converted into a character and/or graphic of a standard style, and the size of the character and/or graphic of the standard style is adjusted according to the average height of characters and/or graphics of the first input.

For example, the characters of standard style may include characters of regular script, Song script, Times New Roman, Arial, and other standard fonts. The graphic of standard style may include rectangle, square, triangle, circle, ellipse, regular pentagon, regular hexagon, parallelogram and so on.

For example, a table of correspondence between an average height of characters and/or graphics of the first input and a size of an adjusted character and/or graphic of standard style may be set in advance. For example, when the average height of characters of the first input is between 1/10 and 1/8 of the height of the handwriting input area of the electronic whiteboard, the size of the adjusted character of standard style is set to font number four; when the average height of characters of the first input is between 1/8 and 1/6 of the height of the handwriting input area of the electronic whiteboard, the size of the adjusted character of standard style is set to font number three.

In other exemplary embodiments, the handwriting characters may also be converted into a predetermined fixed font and font size, so that the electronic whiteboard does not need to automatically adjust the handwriting width of the marker pen, but only needs to adopt the handwriting of the marker pen with a fixed width.

In other exemplary embodiments, calculating the height of the first content of the overlapping area according to the acquired handwriting point information includes: one or more strokes overlapping with each mark line are acquired; the highest Y-axis coordinate and the lowest Y-axis coordinate of one or more strokes overlapping each mark line are determined according to the handwriting point information of each stroke; and a difference between the determined highest Y-axis coordinate and the lowest Y-axis coordinate is taken as the height of the first content of the overlapping area.

In the embodiment, the first content does not need to be identified through the neural network, but only needs to be regarded as a writing track composed of strokes, thereby greatly simplifying the calculation process and basically not affecting the accuracy.

Figure 4A:
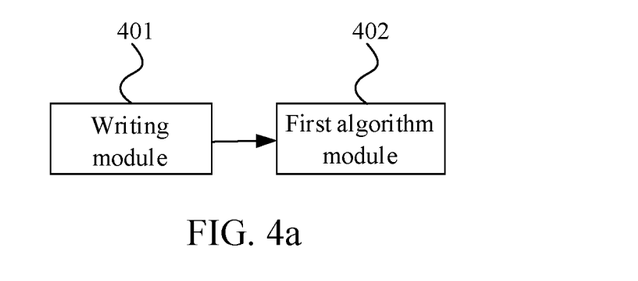
FIGS. 4a and 4b are schematic structural diagrams of two types of devices for handwriting input display according to exemplary embodiments of the present disclosure.

Embodiments of the present disclosure also provide a device for handwriting input display, as shown in FIG. 4a, the device for handwriting input display may include a writing module 401 and a first algorithm module 402. The writing module 401 is configured to receive and display a first input of a user, the first input is one or more first contents input in a handwriting way, and to receive and display a second input of a user, the second input is a mark line for highlighting one or more first contents, and the mark line contains an overlapping area with the one or more first contents; and the first algorithm module 402 is configured to adjust a line width of the mark line according to a height of the first content of the overlapping area.

In some exemplary embodiments, the first algorithm module 402 is further configured to acquire handwriting point information of the first content of the overlapping area; calculate the height of the first content of the overlapping area according to the acquired handwriting point information.

Figure 4B:
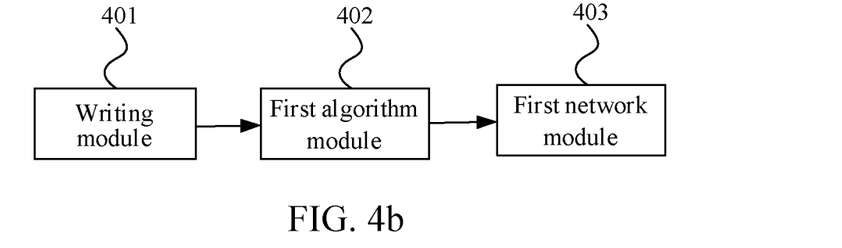

In other exemplary embodiments, as shown in FIG. 4b, the device for handwriting input display further includes a first network module 403, configured to transmit the acquired handwriting point information to the first server; receive a calculation result of the first server, wherein the calculation result is the height of the first content of the overlapping area. At this time, the first algorithm module does not need to calculate the height of the first content of the overlapping area according to the acquired handwriting point information, but only needs to adjust the line width of the mark line according to the calculation result of the first server.

In some exemplary embodiments, the handwriting point information may be divided into multiple arrays, each array includes attribute information of multiple handwriting points in a stroke, and the attribute information includes X-axis coordinates, Y-axis coordinates, pen lift flag bits, and the like.

In some exemplary embodiments, the first algorithm module 402 is further configured to split the first content of the overlapping area into rows. In other exemplary embodiments, the first content of the overlapping area may also be split into rows by the first server.

In some exemplary embodiments, the first content is one or more characters and/or graphics; and calculating the height of the first content of the overlapping area according to the acquired handwriting point information, includes: a height of each character and/or graphic in the overlapping area is calculated; the height of the first content of each row is calculated according to the height of each character and/or graphic.

In some exemplary embodiments, the method further includes identifying the first content of the overlapping area through a neural network.

In some exemplary embodiments, the height of a first content of the overlapping area is calculated according to the acquired handwriting point information, including: one or more strokes overlapping each mark line are acquired; the highest Y-axis coordinate and the lowest Y-axis coordinate of one or more strokes are determined according to the handwriting point information of each stroke; a difference between the highest Y-axis coordinate and the lowest Y-axis coordinate of one or more strokes is taken as the height of the first content of the overlapping area.

In some exemplary embodiments, the first algorithm module 402 calculates the height of each character and/or graphic of the overlapping region, including: the handwriting point information of the first content of the overlapping area is acquired, a first coordinate system according to the acquired handwriting point information is established, wherein an abscissa of the first coordinate system is an X-axis coordinate of the handwriting point, and an ordinate of the first coordinate system is a Y-axis coordinate of the handwriting point; when a spacing between the abscissas of the two handwriting points is less than or equal to a preset spacing, the two handwriting points are determined as the handwriting points of one character and/or graphic; when the spacing between the abscissas of the two handwriting points is larger than the preset spacing, the two handwriting points are determined as the handwriting points of two characters and/or graphics; the height of each character and/or graphic in the overlapping area is obtained by subtracting a Y-axis coordinate of a coordinate point with a minimum Y-axis coordinate from a Y-axis coordinate of a coordinate point with a maximum Y-axis coordinate in multiple handwriting points of each character and/or graphic in the overlapping area.

In some exemplary embodiments, adjusting the line width of the mark line according to the height of the first content of the overlapping area includes: the adjusted line width of the mark line is K1*hL, K1 is a real number between 0.5 and 1.5, and $h_L$ is the height of the first content of one row.

In some exemplary embodiments, K1 is between ⅓ and ⅚.

In some exemplary embodiments, the adjusted mark line is centered on a centerline of each row of a first content in an ordinate direction, or is centered on a mark line before the adjusting.

In some exemplary embodiments, before the second input of the user is received, the writing module 401 is further configured to convert a character and/or graphic of the first input into a character and/or graphic of a standard style, and adjust a size of the character and/or graphic of the standard style according to an average height of characters and/or graphics of the first input.

Figure 4C:
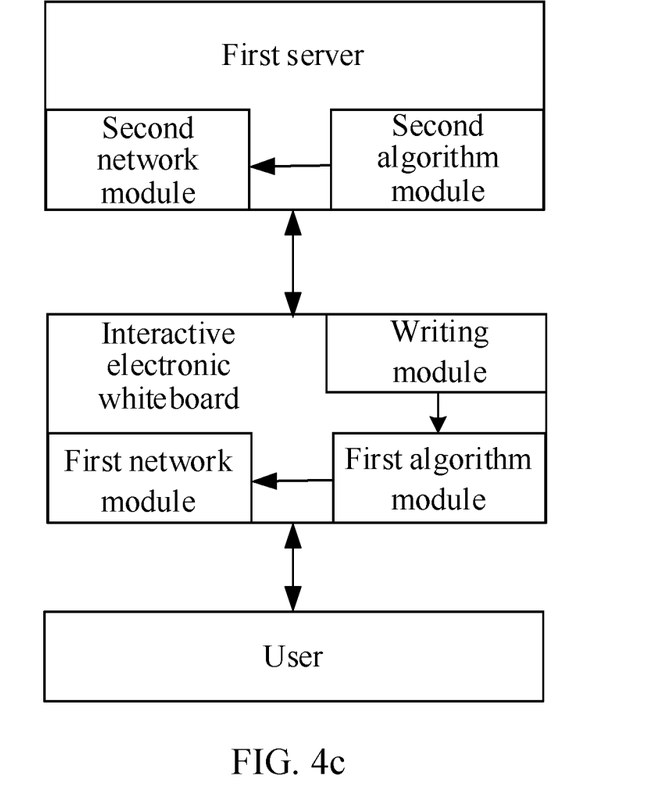
FIGS. 4c and 4d are schematic diagrams of an application scenario and an application flow of a method for handwriting input display according to embodiments of the present disclosure.
Figure 4D:
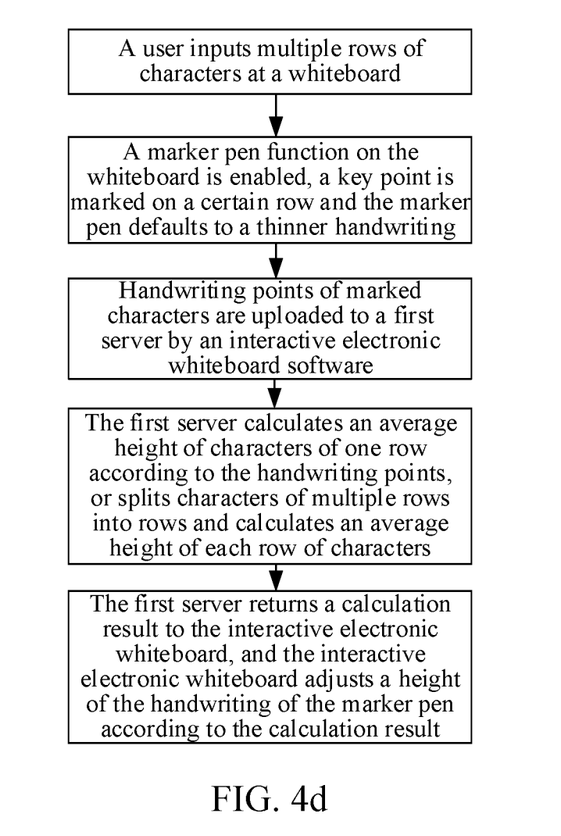

In some exemplary embodiments, the device for handwriting input display is applied to an application scene composed of an interactive electronic whiteboard and a first server, as shown in FIG. 4c, the interactive electronic whiteboard includes a writing module, a first algorithm module and a first network module, and the first server includes a second network module and a second algorithm module. As shown in FIG. 4d, the method for handwriting input display includes the following acts: a conference participant M writes one or more rows of characters in the writing module at the interactive electronic whiteboard.

A meeting participant M or N enables the marker pen (i.e. marker) function on the whiteboard, and crosses a certain row/multiple rows of characters with the marker pen, so as to underline the content that needs to be marked emphatically. The marker pen defaults to a thinner handwriting.

The first algorithm module of the interactive electronic whiteboard calculates a range of characters crossed by the marker pen, and uploads the handwriting point data of the range of characters to the first server through the first network module.

After receiving the handwriting point data, the second network module of the first server calculates an average height h of the paragraph of characters through the second algorithm module, and the calculation method is: $h_L = \Sigma hi/T$ (T is the number of characters in the paragraph, i=1, 2, 3, . . . , T). If the marked text is multi-row, the algorithm server calculates the average heights $h_{L1}, h_{L2}, \ldots, h_{Ln}$ of each row of characters by using the method of row splitting calculation, and then returns the average heights to the interactive electronic whiteboard.

The first server transmits the average height data to the first network module of the interactive electronic whiteboard through the second network module, the first network module transmits the data to the first algorithm module. The first algorithm module calculates the adjusted width of the marker handwriting as $K1=(2/3)*h_L$ so as to be compatible with the situation that the characters are too large or too small, and then the writing module immediately adjusts the width of the marker pen handwriting. Users can experience an effect of automatically adjusting a marker pen width.

An embodiment of the present disclosure also provides a device for handwriting input display, which may include a touch screen, a processor and a memory. Herein, the touch screen is used for interacting with a user; the processor runs a program corresponding to executable program codes by reading the executable program codes stored in the memory for implementing the method for handwriting input display as any one of the above.

Figure 5:
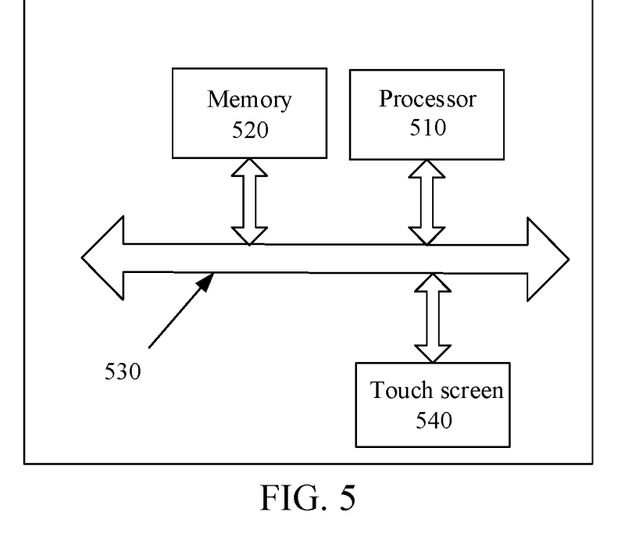
FIG. 5 is a schematic view of a structure of another device for handwriting input display according to an exemplary embodiment of the present disclosure.

As shown in FIG. 5, in an example, a device for handwriting input display may include: a processor 510, a memory 520, a bus system 530, and a touch screen 540, wherein the processor 510, the memory 520, and the touch screen 540 are connected via the bus system 530, the memory 520 is configured to store instructions, and the processor 510 is configured to execute the instructions stored in the memory 520 to control the touch screen 540 to receive the user's input and to display. Specifically, the touch screen 540 may receive and display a first input of a user under the control of the processor 510, wherein the first input is one or more first contents input in a handwriting way; and receive and display a second input of the user, wherein the second input is a mark line for highlighting the one or more first contents, and the mark line contains an overlapping area with the one or more first contents, and an adjusted line width of the mark line is displayed through a touch screen.

It should be understood that the processor 510 may be a Central Processing Unit (CPU), or the processor 510 may be another general-purpose processor, a digital signal processor (DSP), an application specific integrated circuit (ASIC), a field programmable gate array (FPGA), or another programmable logic device, a discrete gate or a transistor logic device, a discrete hardware component, etc. A general-purpose processor may be a microprocessor or the processor may be any conventional processor, etc.

The memory 520 may include a read-only memory and a random access memory, and provides instructions and data to the processor 510. A portion of the memory 520 may also include a non-volatile random access memory. For example, the memory 520 may also store information of a device type.

The bus system 530 may include a power bus, a control bus, a status signal bus, or the like in addition to a data bus. However, for clarity of illustration, various buses are all denoted as the bus system 530 in FIG. 5.

In an implementation process, processing performed by the processing device may be completed by an integrated logic circuit of hardware in the processor 510 or instructions in a form of software. That is, the acts of the method in the embodiments of the present disclosure may be embodied as executed and completed by a hardware processor, or executed and completed by a combination of hardware in the processor and a software module. The software module may be located in a storage medium such as a random access memory, a flash memory, a read only memory, a programmable read-only memory, or an electrically erasable programmable memory, or a register, etc. The storage medium is located in the memory 520. The processor 510 reads information in the memory 520, and completes the acts of the above method in combination with its hardware. In order to avoid repetition, detailed description is not provided herein.

Embodiments of the present disclosure also provide a computer readable storage medium. The computer-readable storage medium stores executable instructions, when the executable instructions are executed by a processor, the method for handwriting input display provided by any embodiment of the present disclosure can be realized. The method for handwriting input display can adjust a line width of a mark line according to a height of first content of an overlapping area, under a condition that the writer has no perception, the width of a marker pen handwriting is automatically adjusted, which solves the technical problems that the marker pen handwriting is too thin to reflect a marking focus, or the width of the marker pen handwriting needs to be constantly adjusted to match the height of the written text. The user does not need to manually adjust the thickness of the marker pen handwriting according to the size of the written text, thus greatly improving the writing experience of the writer. The method for driving a device for handwriting input display to display handwriting input by executing executable instructions is basically the same as the method for handwriting input display provided in the above embodiments of the present disclosure, and will not be described in detail here.

Embodiments of the present disclosure disclose a method for handwriting input display, a device and a computer storage medium. The line width of the mark line is adjusted according to the height of the first content of the overlapping area, under a condition that the writer has no perception, the width of the marker pen handwriting is automatically adjusted, which solves the technical problems that the marker pen handwriting is too thin to reflect a mark focus, or the width of the marker pen handwriting needs to be constantly adjusted to match the height of the written text. The user does not need to manually adjust the thickness of the marker pen handwriting according to the size of the written text, thus greatly improving the writing experience of the writer.

It can be understood by those of ordinary skill in the art that all or some certain acts in the method disclosed above and function modules/units in the system and the apparatus may be implemented as software, firmware, hardware, and proper combinations thereof. In a hardware implementation mode, division of the function modules/units mentioned in the above description is not always division corresponding to physical components. For example, a physical component may have multiple functions, or several physical components may cooperate to execute a function or an act. Some certain components or all components may be implemented as software executed by a processor such as a digital signal processor or a microprocessor, or implemented as hardware, or implemented as an integrated circuit such as an application-specific integrated circuit. Such software may be distributed in a computer-readable medium, and the computer-readable medium may include a computer storage medium (or a non-transitory medium) and a communication medium (or a transitory medium). As known to those of ordinary skill in the art, the term computer storage medium includes volatile and nonvolatile, and removable and irremovable media implemented in any method or technology for storing information (for example, a computer-readable instruction, a data structure, a program module, or other data). The computer storage medium includes, but is not limited to, RAM, ROM, EEPROM, a flash memory or another memory technology, CD-ROM, a digital versatile disk (DVD) or another optical disk storage, a magnetic cassette, a magnetic tape, a magnetic disk storage, or another magnetic storage apparatus, or any other medium that may be configured to store desired information and may be accessed by a computer. In addition, it is known to those of ordinary skill in the art that the communication medium usually includes a computer-readable instruction, a data structure, a program module, or other data in a modulated data signal of, such as, a carrier or another transmission mechanism, and may include any information delivery medium.

Although the embodiments disclosed in the present disclosure are as above, the described contents are only embodiments used for convenience of understanding the present disclosure and are not intended to limit the present disclosure. Any person skilled in the art to which the present disclosure pertains may make any modifications and variations in the form and details of implementations without departing from the spirit and the scope of the present disclosure, but the protection scope of the present disclosure shall still be subject to the scope defined in the appended claims.

The invention claimed is:

1. A method for handwriting input display, comprising:
receiving and displaying a first input of a user, wherein the first input is one or more first contents input in a handwriting way;
receiving and displaying a second input of the user, wherein the second input is a mark line for highlighting the one or more first content, and the mark line contains an overlapping area with the one or more first contents; and
adjusting a line width of the mark line according to a height of a first content of the overlapping area,
wherein before adjusting the line width of the mark line according to the height of the first content of the overlapping area, the method further comprises:
acquiring handwriting point information of the first content of the overlapping area; and
calculating the height of the first content of the overlapping area according to the acquired handwriting point information.

2. The method for handwriting input display of claim 1, wherein after receiving the second input of the user, the method further comprises: splitting the first content of the overlapping area into rows; or, after receiving the first input of the user, the method further comprises: splitting the first content into rows;

the adjusting the line width of the mark line according to the height of the first content of the overlapping area comprises: adjusting the line width of the mark line overlapping with a first content of each row according to a height of the first content of each row of the overlapping area.

3. The method for handwriting input display of claim 1, wherein the handwriting point information is divided into a plurality of arrays, wherein each array comprises attribute information of a plurality of handwriting points in a stroke, and the attribute information comprises X-axis coordinates, Y-axis coordinates, and pen lifting flag bits, and the stroke is a writing track between a pen putting and a pen lifting.

4. The method for handwriting input display of claim 2, wherein the splitting the first content of the overlapping area into rows comprises:

acquiring handwriting point information of a mark line, and determining a number of mark lines according to pen lifting flag bit information of the mark line;

acquiring the handwriting point information of the first content of the overlapping area; and determining that first contents overlapping with a same mark line are located in a same row and first contents overlapping with different mark lines are located in different rows, according to coordinate information of the mark line and the first contents.

5. The method for handwriting input display of claim 2, wherein the splitting the first content into rows comprises:

acquiring the handwriting point information of the first content, and establishing a third coordinate system according to the acquired handwriting point information, wherein an abscissa of the third coordinate system is a Y-axis coordinate of a handwriting point, and an ordinate of the third coordinate system is a number of handwriting points corresponding to the Y-axis coordinate of the handwriting point; and fitting coordinate points in the third coordinate system into a second curve, and determining that handwriting points between adjacent valleys on the second curve are located in a same row.

6. The method for handwriting input display of claim 3, wherein the first content comprises one or more characters and/or graphics, and the calculating the height of the first content of the overlapping area according to the acquired handwriting point information, comprises:

calculating a height of each character and/or graphic in the overlapping area; and calculating a height of the first content of each row according to the height of each character and/or graphic.

7. The method for handwriting input display of claim 6, further comprising:

identifying the first content of the overlapping area through a neural network.

8. The method for handwriting input display of claim 6, wherein the calculating the height of each character and/or graphic in the overlapping area comprises:

acquiring the handwriting point information of the first content of the overlapping area, and establishing a first coordinate system according to the acquired handwriting point information, wherein an abscissa of the first coordinate system is an X-axis coordinate of the handwriting point, and an ordinate of the first coordinate system is a Y-axis coordinate of the handwriting point;

when a spacing between abscissas of two handwriting points is less than or equal to a preset spacing, determining that the two handwriting points are handwriting points of one character and/or graphic; when a spacing between abscissas of two handwriting points is larger than the preset spacing, determining that the two handwriting points are handwriting points of two characters and/or graphics; and subtracting a Y-axis coordinate of a coordinate point with a minimum Y-axis coordinate from a Y-axis coordinate of a coordinate point with a maximum Y-axis coordinate in a plurality of handwriting points of each character and/or graphic in the overlapping area to obtain a height of each character and/or graphic in the overlapping area.

9. The method for handwriting input display of claim 6, wherein the calculating the height of each character and/or graphic in the overlapping area comprises:

acquiring the handwriting point information of the first content of the overlapping area, establishing a first coordinate system and a second coordinate system according to the acquired handwriting point information, wherein an abscissa of the first coordinate system is an X-axis coordinate of the handwriting point, an ordinate of the first coordinate system is a Y-axis coordinate of the handwriting point, an abscissa of the second coordinate system is an X-axis coordinate of the handwriting point, and an ordinate of the second coordinate system is a number of handwriting points corresponding to the X-axis coordinate of the handwriting point;

fitting coordinate points in the second coordinate system into a first curve, and determining that handwriting points between adjacent valleys on the first curve are handwriting points of a same character and/or graphic; and in the first coordinate system, subtracting a Y-axis coordinate of a coordinate point with a minimum Y-axis coordinate from a Y-axis coordinate of a coordinate point with a maximum Y-axis coordinate in a plurality of handwriting points of each character and/or graphic in the overlapping area to obtain a height of each character and/or graphic in the overlapping area.

10. The method for handwriting input display of claim 6, wherein before receiving the second input of the user, the method further comprises:

converting a character and/or graphic of the first input into a character and/or graphic of a standard style, and adjusting a size of the character and/or graphic of the standard style according to an average height of characters and/or graphics of the first input.

11. The method for handwriting input display of claim 3, wherein the calculating the height of the first content of the overlapping area according to the acquired handwriting point information, comprises:

acquiring one or more strokes overlapping with each mark line;

determining a highest Y-axis coordinate and a lowest Y-axis coordinate of the one or more strokes according to handwriting point information of each stroke; and taking a difference between the highest Y-axis coordinate and the lowest Y-axis coordinate of the one or more strokes as the height of the first content of the overlapping area.

12. The method for handwriting input display of claim 1, wherein the adjusting the line width of the mark line according to the height of the first content of the overlapping area comprises:

the adjusted line width of the mark line is $K1*h_L$, K1 is a real number between 0.5 and 1.5, and $h_L$ is the height of the first content.

13. The method for handwriting input display of claim 12, wherein K1 is between ⅓ and ⅚.

14. The method for handwriting input display of claim 1, wherein the adjusted mark line is centered on a centerline of a first content of each row in an ordinate direction, or is centered on the mark line before the adjusting.

15. A device for handwriting input display, comprising: a touch screen, a processor, and a memory; wherein the touch screen is used for interacting with a user, the processor runs a program corresponding to executable program codes by reading the executable program codes stored in the memory for implementing the method for handwriting input display according to claim 1.

16. A non-transitory computer-readable storage medium, storing one or more programs capable of being executed by one or more processors to implement acts of the method for handwriting input display according to claim 1.

17. A device for handwriting input display, comprising: a touch screen, a processor, and a memory; wherein the touch screen is used for interacting with a user, the processor runs a program corresponding to executable program codes by reading the executable program codes stored in the memory for implementing the method for handwriting input display according to claim 2.

18. A device for handwriting input display, comprising: a touch screen, a processor, and a memory; wherein the touch screen is used for interacting with a user, the processor runs a program corresponding to executable program codes by reading the executable program codes stored in the memory for implementing the method for handwriting input display according to claim 3.

* * * * *